US 6,575,296 B1

(12) United States Patent
Zacker

(10) Patent No.: US 6,575,296 B1
(45) Date of Patent: Jun. 10, 2003

(54) DRAWING SHEET AND FILE FOLDER PORTABLE RETAINING APPARATUS

(75) Inventor: Theodore J. Zacker, 2761 NW. 74th Ave., Margate, FL (US) 33063

(73) Assignee: Theodore J. Zacker, Kissimee, FL (US)

( * ) Notice: Subject to any disclaimer, the term of this patent is extended or adjusted under 35 U.S.C. 154(b) by 0 days.

(21) Appl. No.: 09/655,444

(22) Filed: Sep. 5, 2000

(51) Int. Cl.[7] ............................. B60R 7/04; B65D 85/671
(52) U.S. Cl. ...................... 206/225; 206/232; 206/391; 206/425; 220/503; 224/275
(58) Field of Search ................ D19/95; 206/214–216, 206/224, 225, 371, 391, 425, 446, 232; 211/60.1, 11, 69.1, 69.5; 220/503–505; 312/34.18, 34.8, 232, 237, 240; 224/275

(56) References Cited

U.S. PATENT DOCUMENTS

| | | | | |
|---|---|---|---|---|
| D25,839 S | * | 7/1896 | Allen | D19/95 |
| 648,928 A | * | 5/1900 | Davis | 211/69.1 |
| 1,392,134 A | * | 9/1921 | Farber | 211/60.1 |
| 1,502,605 A | * | 7/1924 | Welker | 206/425 |
| 2,871,080 A | * | 1/1959 | Shelly | 206/391 |
| 3,176,662 A | * | 4/1965 | Williams | 211/69.5 |
| 3,704,051 A | | 11/1972 | Kohler | 312/184 |
| 4,103,145 A | * | 7/1978 | Oliveri | 219/222 |
| D274,767 S | | 7/1984 | Fuller | D3/30.1 |
| 4,708,509 A | | 11/1987 | Brunett | 402/4 |
| 4,934,527 A | * | 6/1990 | Ho | 206/224 |
| 5,188,227 A | * | 2/1993 | Ho | 206/214 |
| 5,190,169 A | * | 3/1993 | Sincock | 211/60.1 |
| D362,022 S | | 9/1995 | Larson | D19/89 |
| 5,615,782 A | * | 4/1997 | Choe | 211/60.1 |

* cited by examiner

Primary Examiner—Jim Foster
(74) Attorney, Agent, or Firm—Oltman, Flynn & Kubler

(57) ABSTRACT

An apparatus is provided for retaining file folders and drawing sheets, including a file folder retaining tray portion having a tray portion forward end and a tray portion rearward end; and a coiled drawing sheet retaining portion joined to the tray portion, the drawing sheet retaining portion including several drawing retaining tubes and tube support means. The coiled drawing sheet retaining portion preferably is joined to and rises from the tray portion rearward end. The tray portion and the drawing sheet retaining portion preferably include two parallel and laterally spaced apart side panels which are substantially L-shaped and have side panel lower ends, and side panel forward ends and side panel rearward ends, the side panels defining tray portion and sheet retaining portion side walls; a bottom wall interconnecting the side panel lower ends; a forward wall interconnecting the side panel forward ends; and a rearward wall interconnecting the side panel reward ends. The tube support structures preferably includes at least one set of tube flanges joined to and extend forwardly from the rearward wall, each set of tube flanges supporting a forward and a rearward drawing sheet retaining tube, the at least one set of tube flanges including an upper tube flange extending over and being connected to the drawing sheet retaining tubes and including a lower tube flange extending under and being connected to the drawing sheet retaining tubes.

16 Claims, 9 Drawing Sheets

DRAWING SHEET AND FILE FOLDER PORTABLE RETAINING APPARATUS

BACKGROUND OF THE INVENTION

1. Field of the Invention

The present invention relates generally to the field of office equipment and supplies. More specifically the present invention relates to a portable retaining apparatus for a group of file folders and individual coiled drawing sheets.

The apparatus includes a file folder retaining tray portion and a coiled drawing sheet retaining portion rising from the rear of the tray portion and having several drawing retaining tubes and tube support means. The sides of the apparatus are defined by two parallel and laterally spaced apart side panels which are substantially L-shaped. The sections of the side panels forming the base of the L-shape are the side walls of the tray portion, and the sections of the side panels forming the upright segment of the L-shape are side walls of the coiled drawing sheet retaining portion. A bottom wall extends between the lower ends of the side panels. A forward wall interconnects the side panels at the tray portion forward end and upright an intermediate wall interconnects the side panels substantially beneath the forward end of the sheet retaining portion to define the back wall of the retaining tray portion and to provide structural strength. A rearward wall interconnects the side panels at the side panel rearward ends. Sets of tube flanges and joined to and extend forwardly from the rearward wall and each set supports two rows of drawing retaining tubes. To enhance the portability of the apparatus, a pivoting first handle wraps around the sheet retaining portion upper end and is connected to the upper ends of the side panels. The first handle also serves to wrap over the upper backrest portion of an automobile seat to help hold the apparatus in place during transport. Seat belt loops extend forwardly and integrally from each side panel just above the folder retaining tray. A seat belt is passed through the belt loops to more securely hold the apparatus on an automobile seat. A second handle preferably is connected to and extends forwardly from the forward wall upper end.

2. Description of the Prior Art

There have long been filing cabinets for holding file folders and various bins for storing drawing sheets. Small file boxes have served to retain file folders while being portable. What has not be en provided is a file retaining apparatus capable of securely retaining a group of file folders as well as large drawing sheets. Furthermore nothing portable for individually retaining several coiled drawing sheets has been provided.

Other prior devices include Larson, U.S. Pat. No. Des. 362,022, issued on Sep. 5, 1995 for a document holder. The illustrated holder is a horizontally oriented holder tube resting on a stabilizing stand which keeps the tube from rolling on a support surface such as a table.

Fuller, U.S. Pat. No. Des. 274,767, issued on Jul. 24, 1984, discloses a storage and mailing file for rolled prints, documents, and the like. Fuller appears to be a tubular document holder having a holding tube structure, a tubular bottle with a square exterior for sliding over the tube structure at one end and a tubular cap also with a square exterior for sliding over the tube structure at the opposing end.

Kohler, U.S. Pat. No. 3,704,051, issued on Nov. 28, 1972, reveals a cabinet for the hanging of drawings, plans or the like. The Kohler cabinet has a fall front and with telescopic straight support rails which are pivotally mounted at their ends, and additionally supported on fixed discs which bear, about their periphery, support positions at various distances from the axis of rotation of the disc. The support is therefore adjustable by rotation of the disc.

Brunett, U.S. Pat. No. 4,708,509, issued on Nov. 24, 1987, teaches an apparatus for supporting and storing engineering drawings and the like. Brunett includes several longitudinally aligned ring binder assemblies each of which includes several rings which can be opened and closed and extended through holes formed in the paper sheets to be supported, an elongated support member connected to and arranged in a supporting relation with the binder assemblies and provision for disposing the support member in a horizontal position with the ring binder assemblies extending downwardly therefrom so that the paper sheets hung on the rings can hang downwardly from the rings.

It is thus an object of the present invention to provide an apparatus for retaining both a group of file folders and individual drawing sheets without bending or folding of the drawing sheets.

It is another object of the present invention to provide such an apparatus which is compact and portable.

It is still another object of the present invention to provide such an apparatus which is readily secured to an automobile seat so that architects, engineers and others can conveniently carry the papers they need to field sites.

It is finally an object of the present invention to provide such an apparatus which is durable and inexpensive to manufacture.

SUMMARY OF THE INVENTION

The present invention accomplishes the above-stated objectives, as well as others, as may be determined by a fair reading and interpretation of the entire specification.

An apparatus is provided for retaining file folders and drawing sheets, including a file folder retaining tray portion having a tray portion forward end and a tray portion rearward end; and a coiled drawing sheet retaining portion joined to the tray portion, the drawing sheet retaining portion including several drawing retaining tubes and tube support means.

The coiled drawing sheet retaining portion preferably is joined to and rises from the tray portion rearward end. The tray portion and the drawing sheet retaining portion preferably include two parallel and laterally spaced apart side panels which are substantially L-shaped and have side panel lower ends, and side panel forward ends and side panel rearward ends, the side panels defining tray portion and sheet retaining portion side walls; a bottom wall interconnecting the side panel lower ends; a forward wall interconnecting the side panel forward ends; and a rearward wall interconnecting the side panel reward ends. The tube support structures preferably includes at least one set of tube flanges joined to and extend forwardly from the rearward wall, each set of tube flanges supporting a forward and a rearward drawing sheet retaining tube, the at least one set of tube flanges including an upper tube flange extending over and being connected to the drawing sheet retaining tubes and including a lower tube flange extending under and being connected to the drawing sheet retaining tubes.

The apparatus preferably additionally includes an intermediate wall interconnecting the side panels substantially beneath the forward end of the drawing retaining portion to define the back wall of the retaining tray portion and to provide structural strength. The apparatus preferably additionally includes a forwardly extending pocket extending forwardly from the forward wall, for holding office supply items.

The sheet retaining tubes preferably include laterally extending tabs, each tab having a dowel port, and the side panels having inwardly projecting dowels corresponding in location to the dowel ports; so that the dowels snap fit into the dowel ports to removably interconnect the sheet retaining tubes with the side panels.

The side panels have corresponding and directly opposing tube ports with which the drawing sheet holding tubes register. The apparatus preferably additionally includes several elongate and elastic drawing retaining bands which are secured at each end to the side panels and extend across ends of the holding tubes, obstructing drawing sheets from sliding out of the holding tubes. The folder retaining tray portion preferably includes a tray partition wall extending from the forward wall to the intermediate wall to define a file folder tray compartment and a separate item tray compartment.

The apparatus preferably additionally includes a pivoting first handle wrapping around the drawing sheet retaining portion and connected to the side panels for wrapping over an automobile seat backrest to secure the apparatus to an automobile seat. The apparatus preferably still additionally includes seat belt loops extending forwardly and integrally from each of the side panels, so that a seat belt can be passed through the seat belt loops to secure the apparatus on an automobile seat. The apparatus preferably yet additionally includes a second handle connected to and extending forwardly from the forward wall. The rearward wall has a rearward surface, and preferably additionally includes a rearward pocket mounted to the rearward surface of the rearward wall. The apparatus preferably is formed of a durable plastic.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
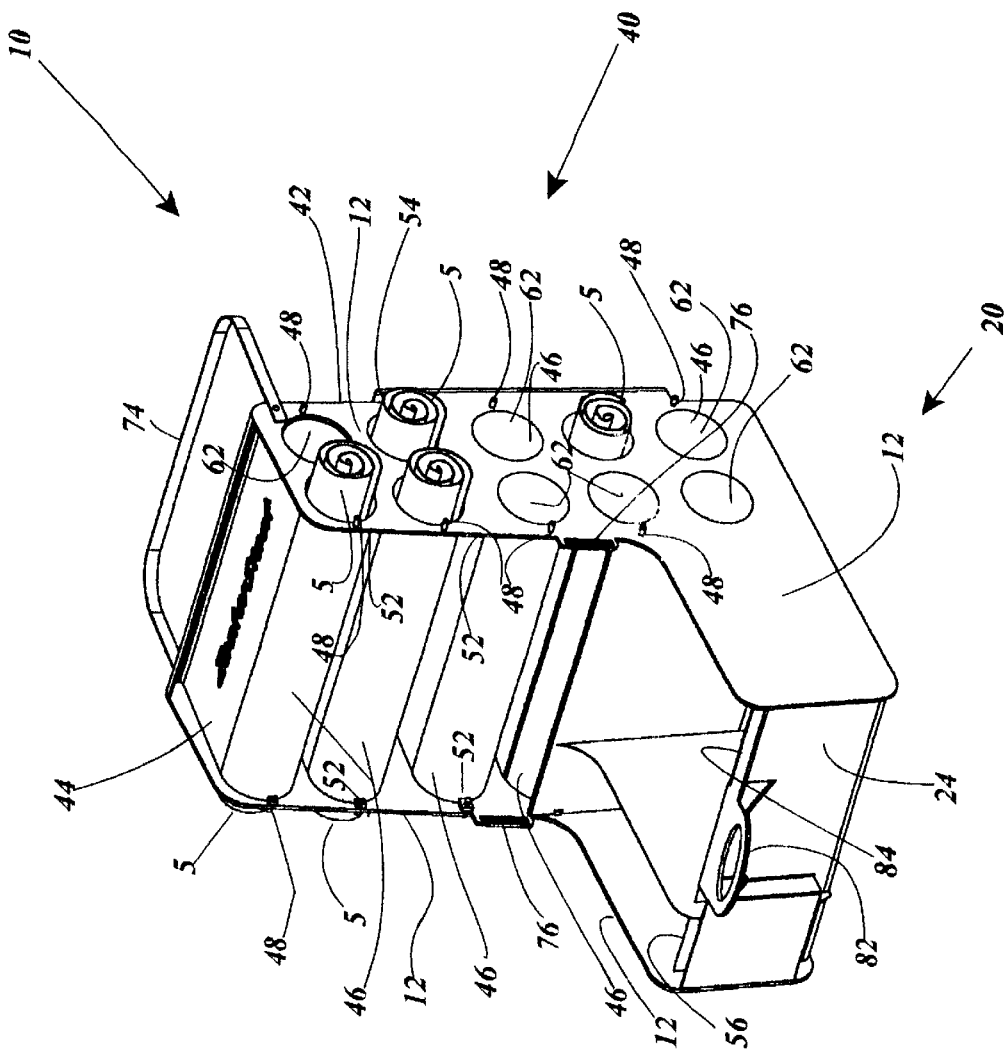
FIG. 1 is a perspective forward view of the preferred embodiment of the apparatus, showing the optional tray partition wall and showing drawing sheets fitted into the sheet retaining tubes.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
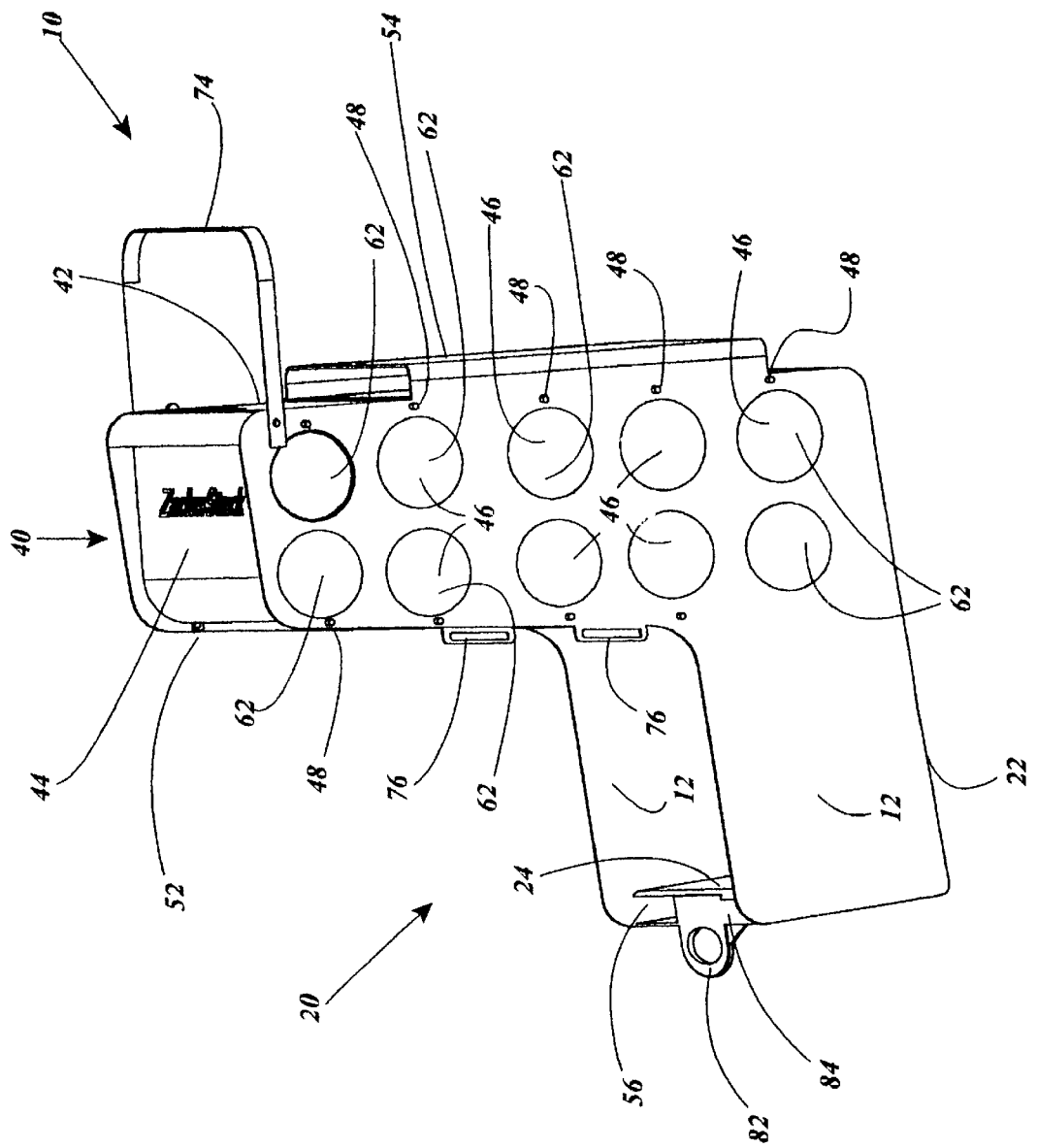
FIG. 2 is a perspective side view of the apparatus of FIG. 1, excluding the tray partition wall and drawing sheets.
Figure 3:
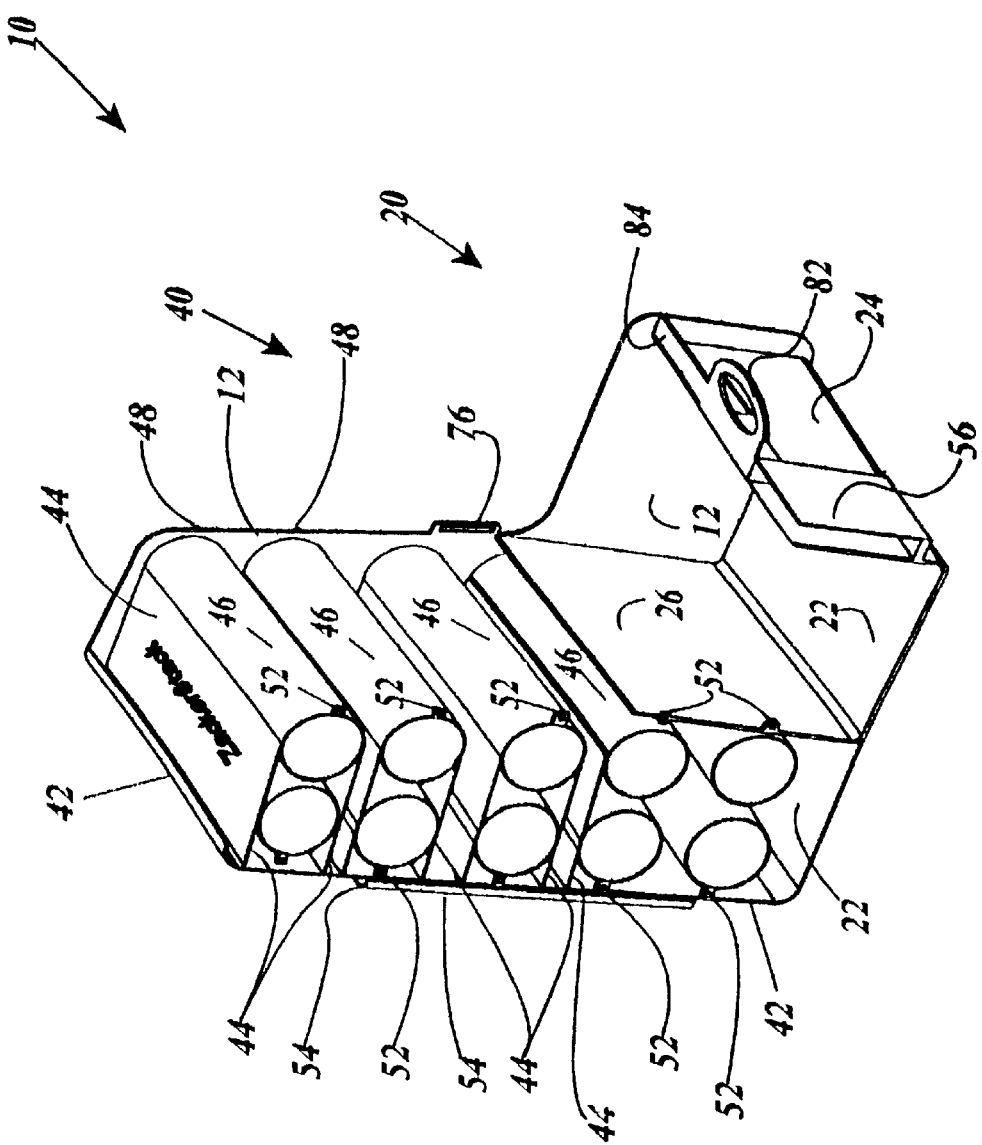
FIG. 3 is a perspective forward view of the apparatus with the proximal side panel removed to reveal the apparatus internal structure, particularly the tube flanges.
Figure 4:
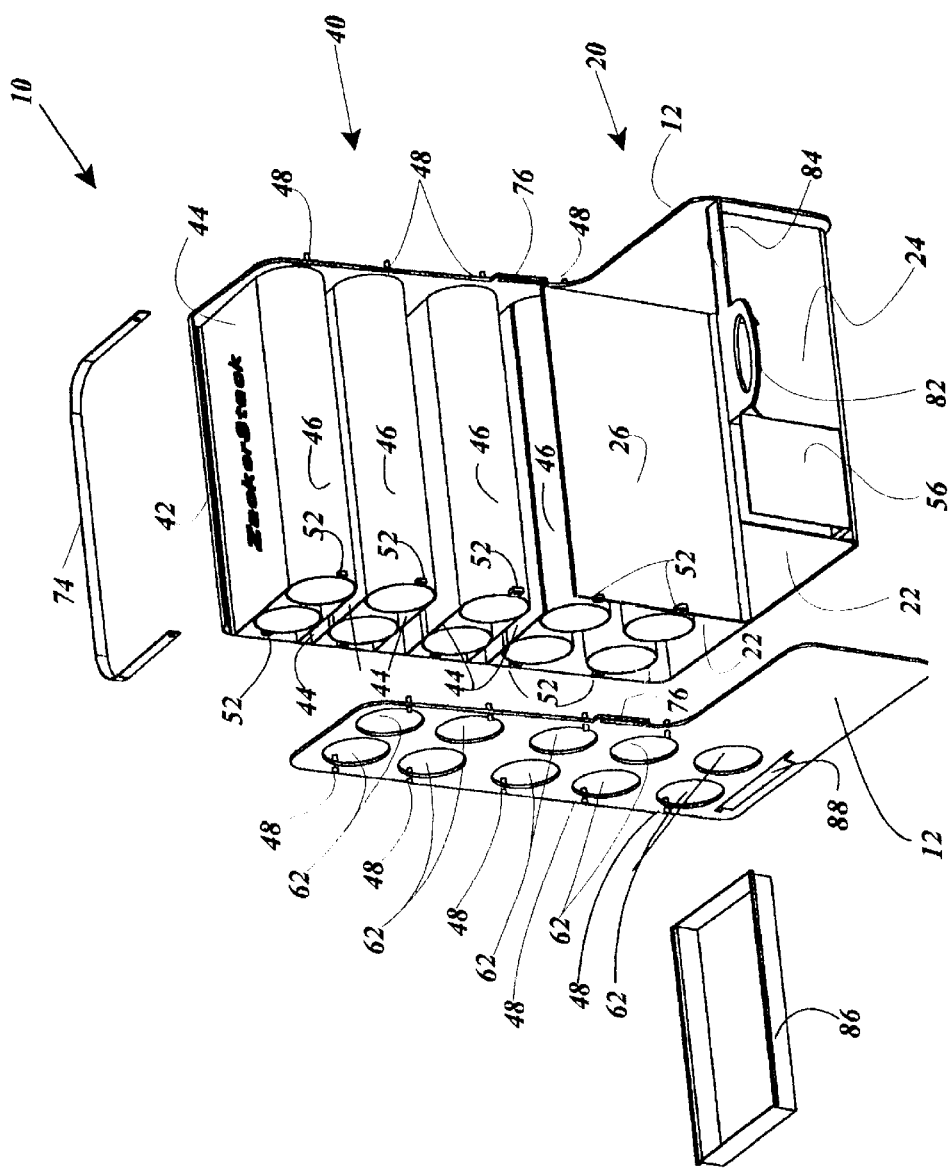
FIG. 4 is a partially exploded perspective view of the apparatus showing a side panel removed and displaced to one side and the optional drawer removed and displaced to the side of the removed side panel.
Figure 5:
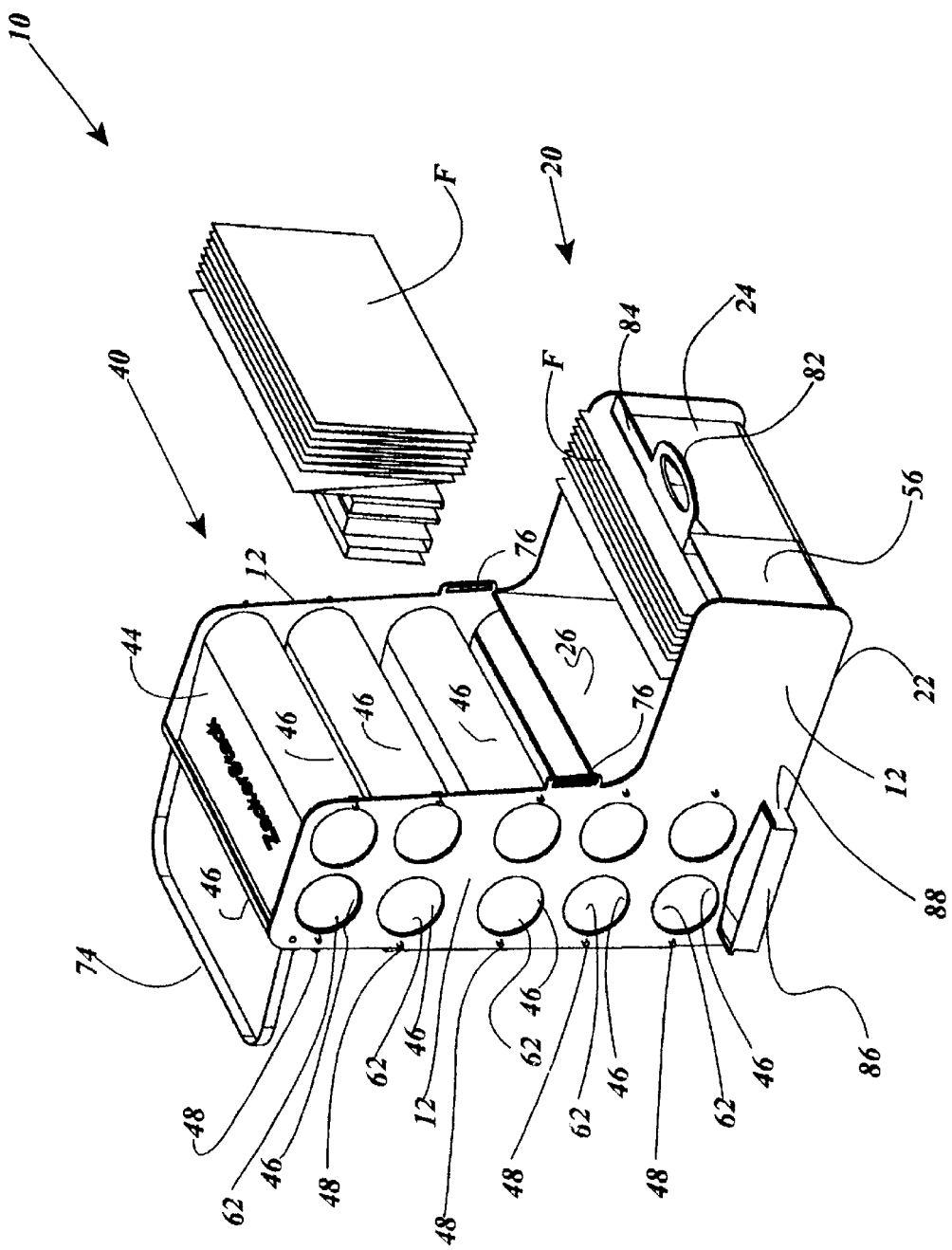
FIG. 5 is a perspective view of the apparatus having the optional drawer and showing one file folder assembly within the tray portion and showing another file folder assembly poised to be fitted into the tray portion.
Figure 6:
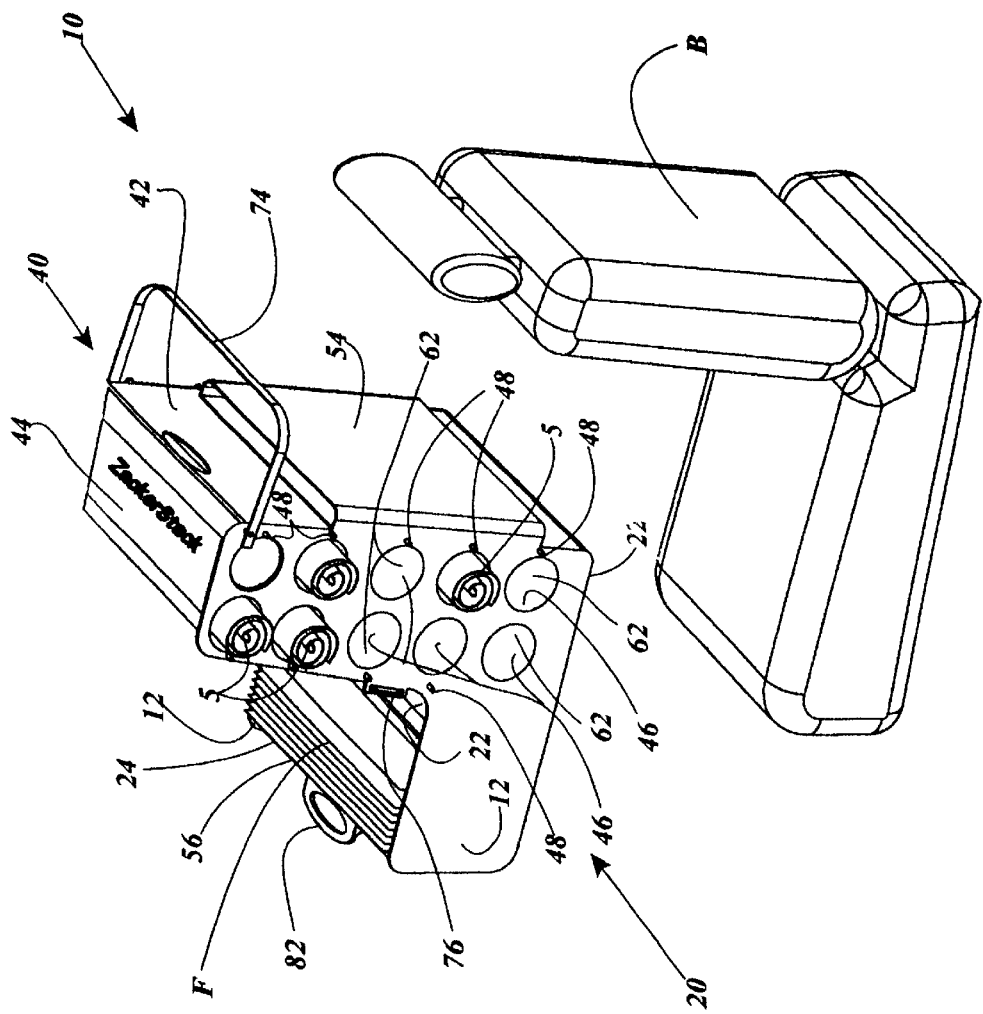
FIG. 6 is a rearward side perspective view of the apparatus poised for placement onto an automobile seat, the tray portion containing file folders and several of the sheet retaining tubes containing drawing sheets.
Figure 7:
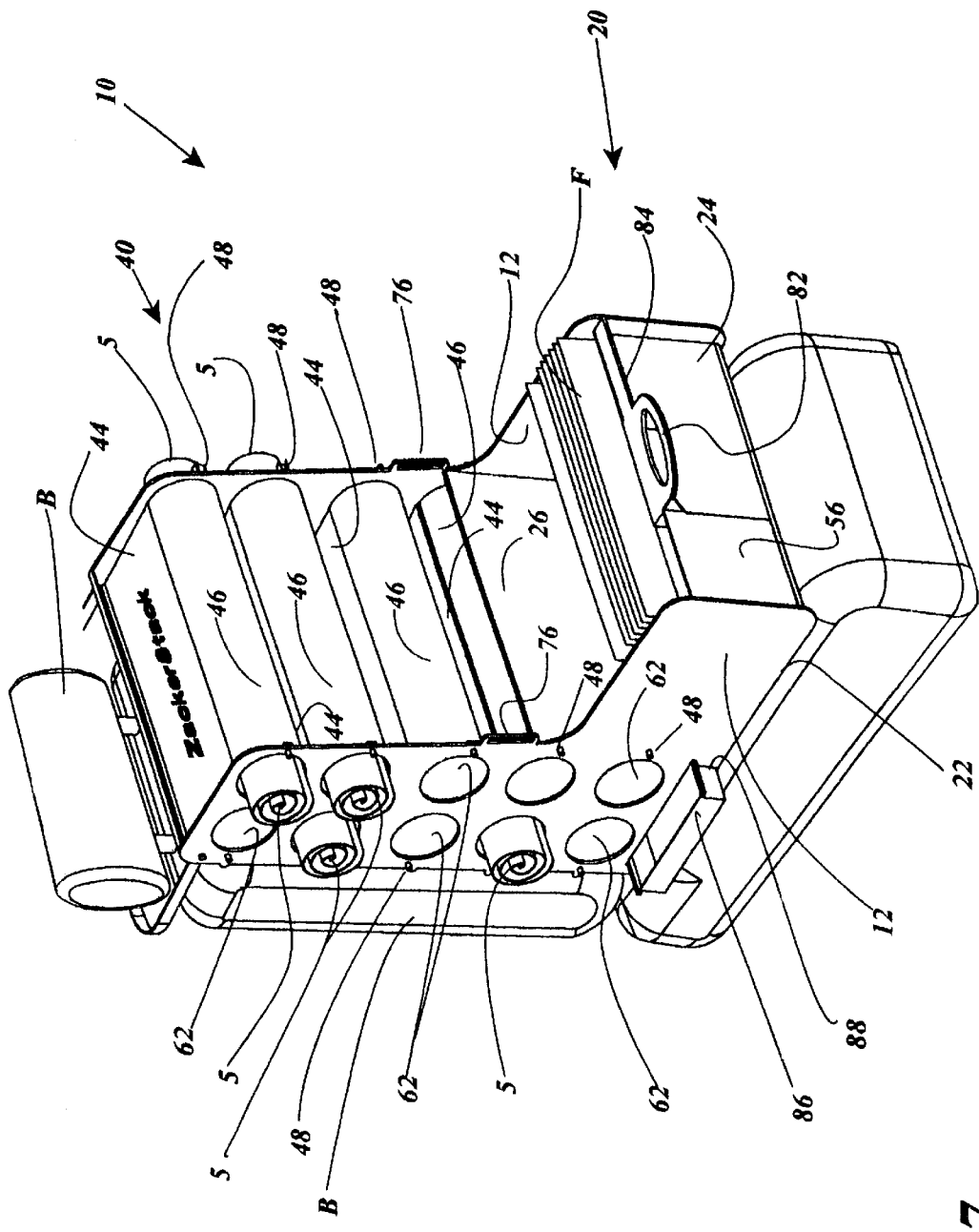
FIG. 7 is a forward side perspective view of the apparatus fitted onto an automobile seat, with the pivoting first handle pivoted around the seat back rest. No seat belt is shown, but if one were present it would be fitted through the seat belt loops on the front of the apparatus.
Figure 8:
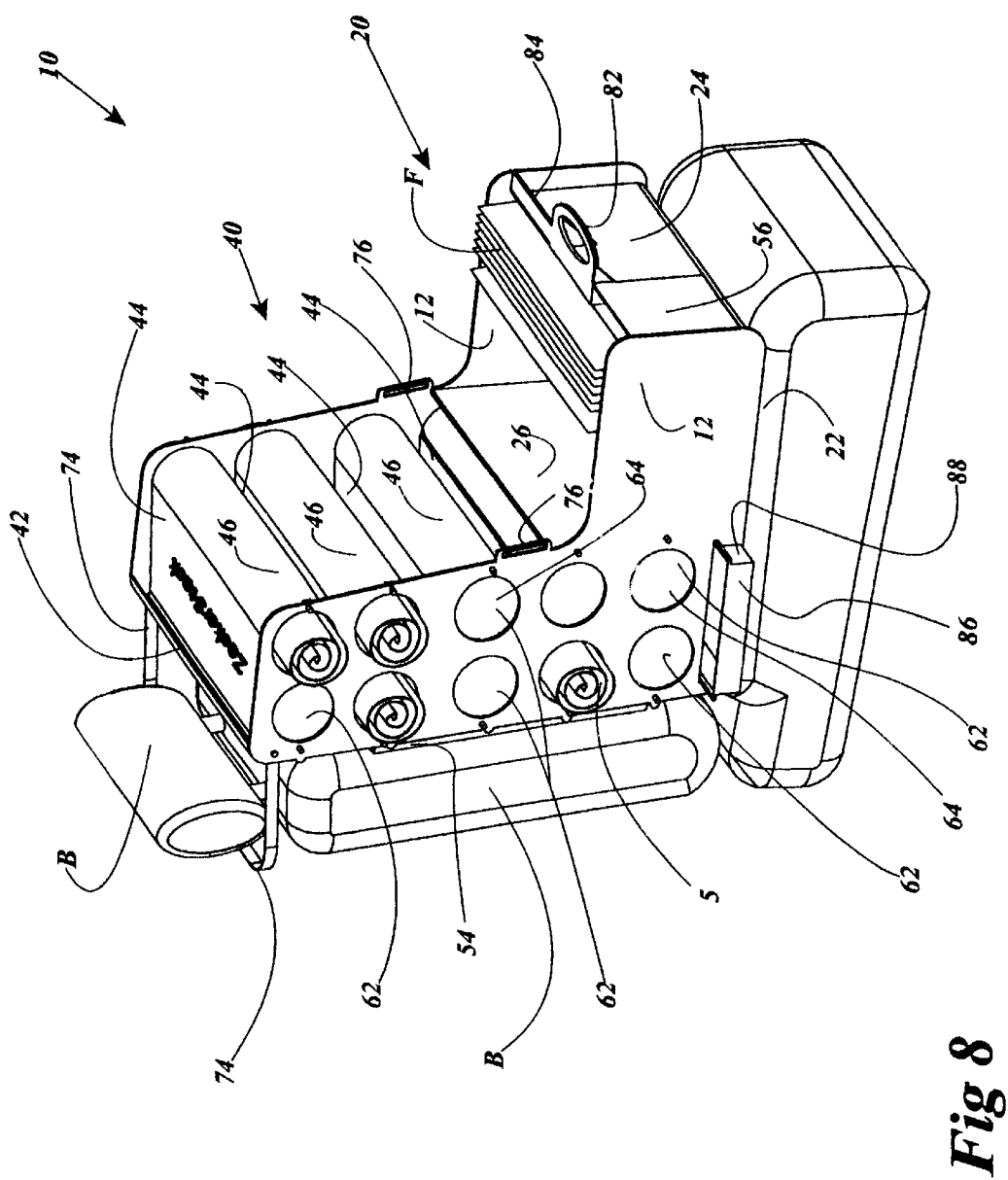
FIG. 8 is a perspective side view of the apparatus of FIG. 7, showing the optional retaining band for holding the drawing sheets in their retaining tubes.
Figure 9:
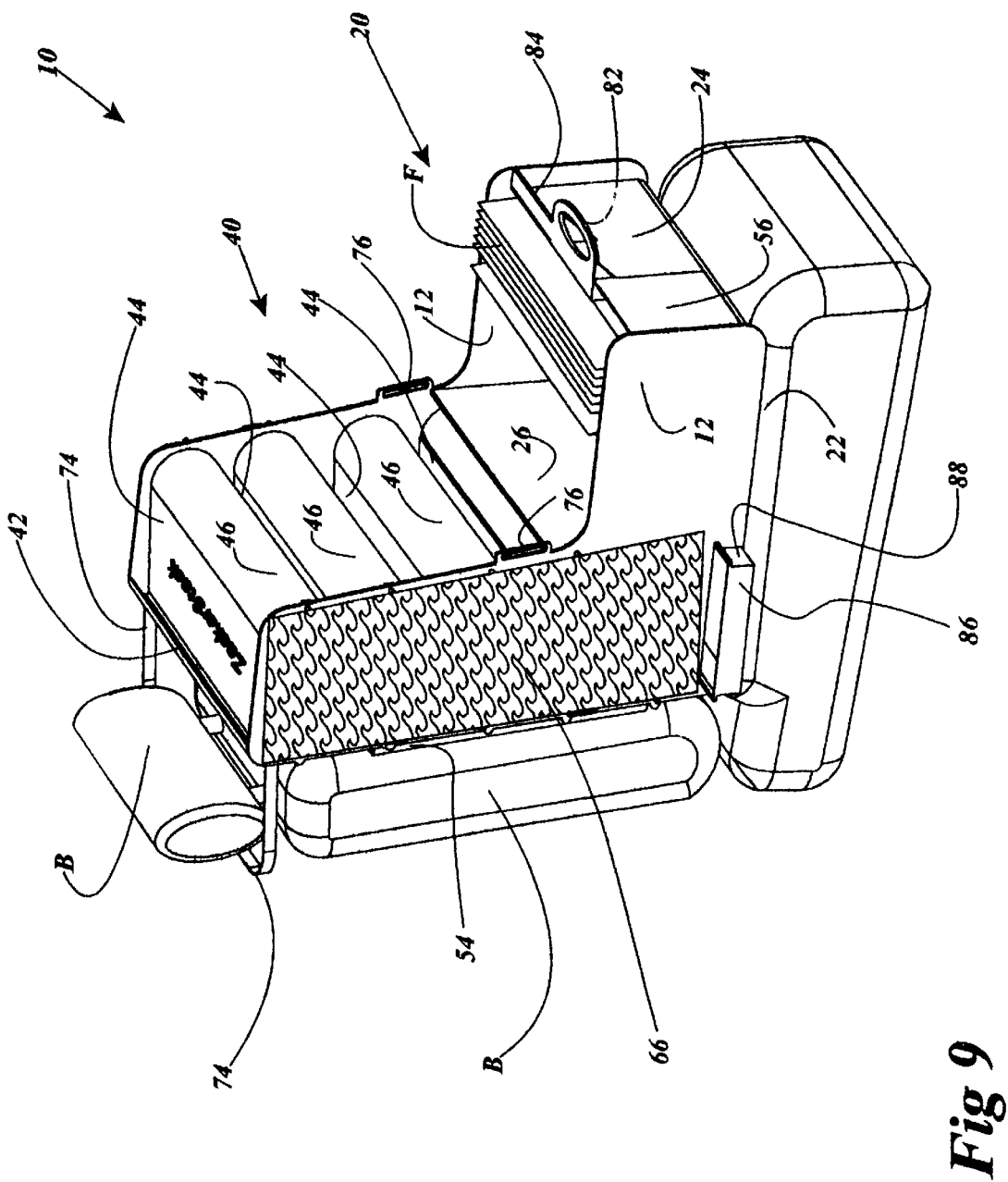
FIG. 9 is a view as in FIG. 8, showing the retaining sheet in place of the retaining band for holding the drawing sheets in their retaining tubes.

Referring to FIGS. 1–9, a portable retaining apparatus 10 is disclosed for retaining individual coiled drawing sheets S and a group of file folders F. Apparatus 10 includes a file folder retaining tray portion 20 and a coiled drawing sheet retaining portion 40 rising from the rear of tray portion 20 and having several drawing retaining tubes 46 and tube support structures 48. The sides of apparatus 10 are defined by two parallel and laterally spaced apart side panels 12 which preferably are substantially L-shaped. The sections of the side panels 12 forming the base of the L-shape define side walls of tray portion 20, and the sections of the side panels 12 forming the upright segment of the L-shape define side walls of the coiled drawing sheet retaining portion 40.

A bottom wall 22 extends between and interconnects the lower ends of side panels 12. An upright forward wall 24 interconnects the side panels 12 at the tray portion 20 forward end. An upright intermediate wall 26 interconnects the side panels 12 substantially beneath the forward end of the sheet retaining portion 40 to define the back wall of the tray portion 20 and to provide structural strength to apparatus 10. An upright rearward wall 42 interconnects the side panels 12 at the side panel 12 rearward ends.

Several sets of tube flanges 44 and are joined to and extend forwardly from rearward wall 42 and each set preferably supports a forward and a rearward drawing sheet retaining tube 46. Each set of tube flanges 44 includes an upper tube flange 44 which extends over and is bonded to the upper surfaces of a forward drawing sheet retaining tube 46 and a rearward drawing sheet retaining tube 46, and includes a lower tube flange 44 which extends under and is bonded to the lower surfaces of the forward and rearward drawing sheet retaining tubes 46. Bonding is preferably achieved with a suitable cement. It is preferred that several sets of tube flanges 44 be provided, such as the exemplary five sets shown in the various FIGURES. Providing numbers of sets of tube flanges 44 greater than or fewer than the illustrated five, and providing numbers of drawing sheet retaining tubes 46 within each set greater than or fewer than the illustrated two are contemplated.

The sheet retaining tubes 86 and the intermediate wall 26 preferably have laterally extending tabs, each tab including a dowel port 52. Side panels 12 preferably have inwardly projecting dowels 48 corresponding in location to dowel ports 52 to engagingly receive dowels 48 and thus hold side walls 12 in engagement with the remainder of apparatus 10. Dowels 48 are slightly conical, expanding in diameter as they progress outwardly, so that they snap fit into the dowel ports 52 for a tight, resilient friction engagement. Alternatively, many parts of apparatus 10 may be formed as a unified piece in a mold.

A rearward pocket 54 is preferably provided on the rear surface of rearward wall 42 for receiving various items selected by the user. A forwardly extending forward pocket 56 is integrally formed with forward wall 24 and extends from one side panel 12 part way along forward wall 24 toward the other side panel 12, for holding pencils and other small office supply items.

Side panels 12 have corresponding and directly opposing tube ports 62 which register with drawing sheet retaining tubes 46. An elongate and elastic drawing retaining band 64 or flexible drawing retaining sheet 66 is secured at each end to the outward surface of the two panels, over the ends of each sheet retaining tube 46, holding drawing sheets S against sliding out of tubes 46 with the force of gravity when apparatus 10 is tilted during transport. Retaining tubes 46 and tube ports 62 are preferably arranged in a forward vertical series and a rearward vertical series, as illustrated.

The folder retaining tray portion 20 preferably has a tray partition wall 72 extending from forward wall 24 to intermediate wall 26 to separate the tray portion 20 area for separating file folders F from a lateral compartment for holding any of various items the user may wish to bring along. To enhance the portability of apparatus 10, a pivoting first handle 74 wraps around the drawing sheet retaining portion 40 upper end and is connected to the upper ends of side panels 12. First handle 74 also servers to wrap over the upper backrest portion B of an automobile seat to help hold apparatus 10 in place during transport. See FIGS. 6–9. Seat belt loops 76 extend forwardly and integrally from each side panel 12 just above folder retaining tray portion 20. A seat belt is passed through the belt loops 76 to more securely hold apparatus 10 on an automobile seat. A second handle 82 preferably is connected to and extends forwardly from the forward wall 24 upper end, and is part of a forward lip 84 extending laterally to the forward pocket 56 and to the opposing side wall 12. A drawer 86 is preferably provided in the a side of apparatus 10 for holding small items such as pencils. Drawer 86 sliding fits through a drawer port 88 in a side wall 12 at the lower end of apparatus 10, so that drawer 86 rides on top of bottom wall 22. See FIGS. 4 and 5.

Apparatus 10 is preferably made of a suitable, durable plastic. The drawing sheet retaining tubes 46 are preferably made of polyvinyl chloride or PVC, or are made of the same plastic as the rest of apparatus 10.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for retaining file folders and drawing sheets, comprising:

a file folder retaining tray portion having a tray portion forward end and a tray portion rearward end and a tray portion upper end;

and a coiled drawing sheet retaining portion joined to said tray portion, said drawing sheet retaining portion comprising a plurality of drawing retaining tubes and tube support means;

wherein said tray portion and said drawing sheet retaining portion comprise: two parallel and laterally spaced apart side panels which are substantially L-shaped and have side panel lower ends, side panel forward ends and side panel rearward ends, said side panels defining both tray portion and sheet retaining portion side walls; a bottom wall interconnecting said side panel lower ends; a forward wall interconnecting said side panel forward ends; and a rearward wall interconnecting said side panel rearward ends, said side walls and said forward wall defining a file folder passing opening in said tray portion upper end for passing file folders into and out of said tray portion.

2. The apparatus of claim 1, wherein said coiled drawing sheet retaining portion is joined to and extends upwardly from said tray portion rearward end.

3. An apparatus for retaining file folders and drawing sheets, comprising:

a file folder retaining tray portion having a tray portion forward end and a tray portion rearward end;

and a coiled drawing sheet retaining portion joined to said tray portion, said drawing sheet retaining portion comprising a plurality of drawing retaining tubes and tube support means;

wherein said coiled drawing sheet retaining portion is joined to and extends upwardly from said tray portion rearward end;

wherein said tray portion and said drawing sheet retaining portion comprise: two parallel and laterally spaced apart side panels which are substantially L-shaped and have side panel lower ends, side panel forward ends and side panel rearward ends, said side panels defining both tray portion and sheet retaining portion side walls; a bottom wall interconnecting said side panel lower ends; a forward wall interconnecting said side panel forward ends; and a rearward wall interconnecting said side panel rearward ends;

wherein said tube support means comprise: at least one set of tube flanges joined to and extend forwardly from said rearward wall, each said set of tube flanges supporting a forward and a rearward said drawing sheet retaining tube, said at least one set of tube flanges comprising an upper tube flange extending over and being connected to said drawing sheet retaining tubes and comprises a lower tube flange extending under and being connected to said drawing sheet retaining tubes.

4. The apparatus of claim 3, additionally comprising an intermediate wall interconnecting said side panels substantially beneath the forward end of said drawing retaining portion to define the back wall of the retaining tray portion and to provide structural strength.

5. The apparatus of claim 3, wherein said sheet retaining tubes comprise laterally extending tabs, each said tab having a dowel port, and wherein said side panels have inwardly projecting dowels corresponding in location to said dowel ports;

such that said dowels snap fit into said dowel ports to removably interconnect said sheet retaining tubes with said side panels.

6. The apparatus of claim 3, wherein said side panels have corresponding and directly opposing tube ports with which said drawing sheet holding tubes register.

7. The apparatus of claim 6, additionally comprising:
a plurality of elongate and elastic drawing retaining bands which are secured at each end to said side panels and extend across ends of said holding tubes, obstructing drawing sheets from sliding out of said holding tubes.

8. The apparatus of claim 4, wherein said folder retaining tray portion comprises a tray partition wall extending from said forward wall to said intermediate wall to define a file folder tray compartment and a separate item tray compartment.

9. The apparatus of claim 3, additionally comprising a pivoting first handle wrapping around said drawing sheet retaining portion and being connected to said side panels for wrapping over an automobile seat backrest to secure said apparatus to an automobile seat.

10. The apparatus of claim 3, additionally comprising seat belt loops extending forwardly and integrally from each said side panel, such that a seat belt can be passed through said seat belt loops to secure said apparatus on an automobile seat.

11. The apparatus of claim 3, additionally comprising a second handle connected to and extending forwardly from said forward wall.

12. The apparatus of claim 3, wherein said rearward wall has a rearward surface, additionally comprising a rearward pocket mounted to said rearward surface of said rearward wall.

13. The apparatus of claim 3, wherein said apparatus is formed of a durable plastic.

14. An apparatus for retaining file folders and drawing sheets, comprising:
a file folder retaining tray portion having a tray portion forward end and a tray portion rearward end;
and a coiled drawing sheet retaining portion joined to said tray portion, said drawing sheet retaining portion comprising a plurality of drawing retaining tubes and tube support means;
wherein said coiled drawing sheet retaining portion is joined to and extends upwardly from said tray portion rearward end;
wherein said tray portion and said drawing sheet retaining portion comprise: two parallel and laterally spaced apart side panels which are substantially L-shaped and have side panel lower ends, side panel forward ends and side panel rearward ends, said side panels defining both tray portion and sheet retaining portion side walls; a bottom wall interconnecting said side panel lower ends; a forward wall interconnecting said side panel forward ends; and a rearward wall interconnecting said side panel rearward ends;
a forwardly extending pocket extending forwardly from said forward wall, for holding office supply items.

15. An apparatus for retaining file folders and drawing sheets, comprising:
a file folder retaining tray portion having a tray portion forward end and a tray portion rearward end and a tray portion upper end;
and a coiled drawing sheet retaining portion joined to said tray portion, said drawing sheet retaining portion comprising a plurality of drawing sheet retaining tubes and tube support means;
wherein said tray portion comprises laterally spaced apart first and second tray portion side wall structures, each said tray portion side wall structure comprising a side panel, and wherein said sheet retaining portion comprises laterally spaced apart first and second sheet retaining portion side wall structures; said first tray portion side wall structure and said first sheet retaining portion side wall structure together defining substantially an L-shape, and said second tray portion side wall structure and said second sheet retaining portion side wall structure together defining substantially an L-shape, said tray portion side wall structures comprising tray portion side wall structure lower ends and comprising tray portion side wall structure forward ends; an apparatus bottom wall interconnecting said tray portion side wall structure lower ends; a tray portion forward wall structure interconnecting said tray portion side wall structure forward ends; said tray portion side wall structures and said tray portion forward wall structure together defining a file folder passing opening in said tray portion upper end for passing file folders into and out of said tray portion;
wherein said drawing sheet retaining tubes open through said sheet retaining side wall structures.

16. Apparatus for retaining file folders and coiled drawing sheets, comprising:
a tray portion, said tray portion including a tray portion bottom wall, a tray portion side wall and a tray portion front wall, said tray portion front wall and said tray portion side wall defining a tray opening;
a coiled drawing sheet retaining portion having sheet retaining portion side walls, coiled drawing sheet passing openings in said sheet retaining portion side walls, and drawing sheet retaining tubes extending into said coiled drawing sheet retaining portion from said coiled drawing sheet passing openings;
and coiled drawing sheets in said drawing sheet retaining tubes;
said tray portion and said coiled drawing sheet retaining portion being connected together such that said tray portion side walls and said coiled drawing sheet retaining portion together form opposing L-shapes.

* * * * *